(12) United States Patent
Nagatsuka

(10) Patent No.: US 10,118,290 B2
(45) Date of Patent: Nov. 6, 2018

(54) SUPPORT STRUCTURE FOR AN UPPER HALF BODY OF A ROBOT

(71) Applicant: THK CO., LTD., Tokyo (JP)

(72) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/512,256

(22) PCT Filed: Sep. 18, 2015

(86) PCT No.: PCT/JP2015/076624
§ 371 (c)(1),
(2) Date: Mar. 17, 2017

(87) PCT Pub. No.: WO2016/043304
PCT Pub. Date: Mar. 24, 2016

(65) Prior Publication Data
US 2017/0282356 A1     Oct. 5, 2017

(30) Foreign Application Priority Data

Sep. 19, 2014   (JP) ................................ 2014-191699

(51) Int. Cl.
*B25J 5/00* (2006.01)
*B25J 9/00* (2006.01)
*G06N 3/00* (2006.01)

(52) U.S. Cl.
CPC ............... *B25J 5/00* (2013.01); *B25J 9/0009* (2013.01); *G06N 3/008* (2013.01)

(58) Field of Classification Search
CPC ........ B25J 5/00; B25J 9/0009; B25J 17/0291; B25J 9/0087; G06N 3/008
See application file for complete search history.

(56) References Cited

U.S. PATENT DOCUMENTS

| | | | |
|---|---|---|---|
| 1,983,329 A * | 12/1934 | Wallace | A63B 69/36 434/252 |
| 5,142,803 A * | 9/1992 | Lang | B25J 9/0003 348/61 |

(Continued)

FOREIGN PATENT DOCUMENTS

| | | |
|---|---|---|
| JP | 58-502189 A | 12/1983 |
| JP | 11-33972 A | 2/1999 |

(Continued)

OTHER PUBLICATIONS

Decision to Grant a Patent dated Jan. 30, 2017, issued in counterpart Japanese Application No. 2014-191699 w/ English translation (6 pages).

(Continued)

*Primary Examiner* — Khoi H Tran
*Assistant Examiner* — Jorge O Peche
(74) *Attorney, Agent, or Firm* — Westerman, Hattori, Daniels & Adrian, LLP

(57) ABSTRACT

A support structure for an upper half body of a robot includes: a columnar backbone pan extending in an upward direction from a haunch bone part of a robot; an upper half body support part connected to the backbone part; and a driving unit on which an arm unit of the robot is rotatably mounted and which has an accommodation space receiving at least a predetermined actuator for driving said arm unit to rotate from the outside of the arm unit, wherein the driving unit is connected to the upper half body support part and the haunch bone part at a first connection point on the upper half body support part which is away a predetermined distance from a connection point of the upper half body support part and the backbone part to a side thereof, and at a second connection point on the haunch bone part, respectively.

6 Claims, 11 Drawing Sheets

(56) References Cited

U.S. PATENT DOCUMENTS

| | | | | |
|---|---|---|---|---|
| 5,182,557 | A * | 1/1993 | Lang | B25J 9/0003 318/568.11 |
| 5,198,893 | A * | 3/1993 | Lang | B25J 9/0003 348/61 |
| 5,509,810 | A * | 4/1996 | Schertz | G09B 23/28 434/262 |
| 5,828,928 | A * | 10/1998 | Sasago | G03G 15/0898 399/111 |
| 6,463,356 | B1 * | 10/2002 | Hattori | B62D 57/032 318/568.12 |
| 6,564,888 | B1 * | 5/2003 | Gomi | B62D 57/032 180/8.6 |
| 6,583,595 | B1 * | 6/2003 | Hattori | B62D 57/032 318/567 |
| 7,013,201 | B2 * | 3/2006 | Hattori | B62D 57/032 180/8.1 |
| 8,525,853 | B1 * | 9/2013 | Hickman | G06T 19/00 345/420 |
| 2003/0120388 | A1 * | 6/2003 | Kuroki | B62D 57/032 700/245 |
| 2005/0104548 | A1 * | 5/2005 | Takenaka | B62D 57/02 318/568.12 |
| 2006/0004487 | A1 * | 1/2006 | Sugiyama | B60R 25/257 700/245 |
| 2006/0055358 | A1 * | 3/2006 | Ogawa | B25J 9/1674 318/568.24 |
| 2007/0010913 | A1 * | 1/2007 | Miyamoto | B25J 9/1658 700/264 |
| 2007/0021870 | A1 * | 1/2007 | Nagasaka | B25J 13/084 700/245 |
| 2007/0083290 | A1 * | 4/2007 | Nagasaka | B25J 9/1671 700/245 |
| 2007/0185618 | A1 * | 8/2007 | Nagasaka | B62D 57/032 700/245 |
| 2009/0105878 | A1 * | 4/2009 | Nagasaka | B25J 13/084 700/245 |
| 2009/0210093 | A1 * | 8/2009 | Jacobsen | A61H 3/008 700/260 |
| 2009/0272585 | A1 * | 11/2009 | Nagasaka | B25J 9/1633 180/8.6 |
| 2010/0057253 | A1 * | 3/2010 | Kwon | B25J 19/0091 700/245 |
| 2010/0200312 | A1 * | 8/2010 | Takenaka | B25J 9/0009 180/8.6 |
| 2010/0216370 | A1 * | 8/2010 | Hoeting | A63H 11/18 446/355 |
| 2010/0243344 | A1 * | 9/2010 | Wyrobek | B25J 5/007 180/21 |
| 2011/0185837 | A1 * | 8/2011 | Alfayad | B62D 57/032 74/490.05 |
| 2012/0061155 | A1 * | 3/2012 | Berger | B25J 5/007 180/21 |
| 2013/0211594 | A1 * | 8/2013 | Stephens, Jr. | B25J 9/1689 700/259 |
| 2014/0212243 | A1 * | 7/2014 | Yagi | A61H 3/00 414/2 |
| 2015/0068350 | A1 * | 3/2015 | Kirihara | B25J 17/02 74/490.05 |
| 2017/0036346 | A1 * | 2/2017 | Kamioka | B62D 57/032 |
| 2018/0021941 | A1 * | 1/2018 | Berger | B25J 5/007 180/21 |
| 2018/0071874 | A1 * | 3/2018 | Bergeron | B23Q 1/54 |

FOREIGN PATENT DOCUMENTS

| | | |
|---|---|---|
| JP | 3099206 U | 4/2003 |
| JP | 3099206 U | 4/2004 |
| JP | 2005-161413 A | 6/2005 |
| JP | 2012-148366 A | 8/2012 |
| JP | 2013-91146 A | 5/2013 |
| JP | 5877686 B2 | 3/2016 |
| TW | 203271 | 4/1993 |

OTHER PUBLICATIONS

Notification of Transmittal of Translation of the International Preliminary Report on Patentability (Form PCT/IB/338) issued in counterpart International Application No. PCT/JP2015/076624 dated Mar. 30, 2017 with Forms PCT/IB/373 and PCT/ISA/237 (6 pages).
International Search Report dated Nov. 17, 2015, issued in counterpart International Application No. PCT/JP2015/076624 (2 pages).
Taiwanese Search Report dated Jul. 5, 2017, issued in counterpart Taiwanese application No. 104130962, (1 page).
Office Action dated Jul. 6, 2017, issued in counterpart Taiwanese application No. 104130962, with English translation. (6 pages).
Office Action dated Oct. 17, 2017, issued in counterpart German Application No. 11 2015 004 252.0, with English translation (11 pages).
Notification of Reasons for Refusal dated Oct. 4, 2016, issued in Japanese Application No. 2014-191699 with English translation. (4 pages).

* cited by examiner

[Fig. 1]
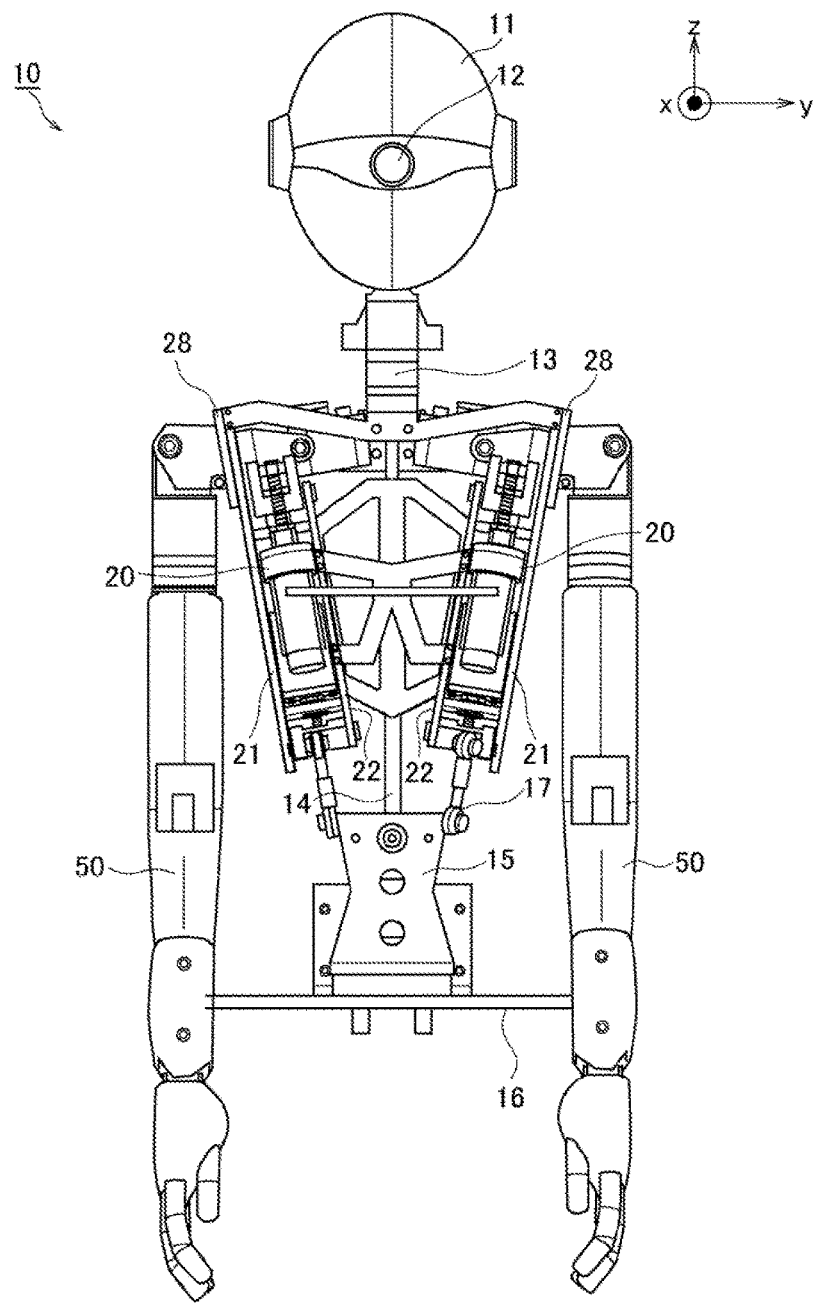

[Fig. 2]
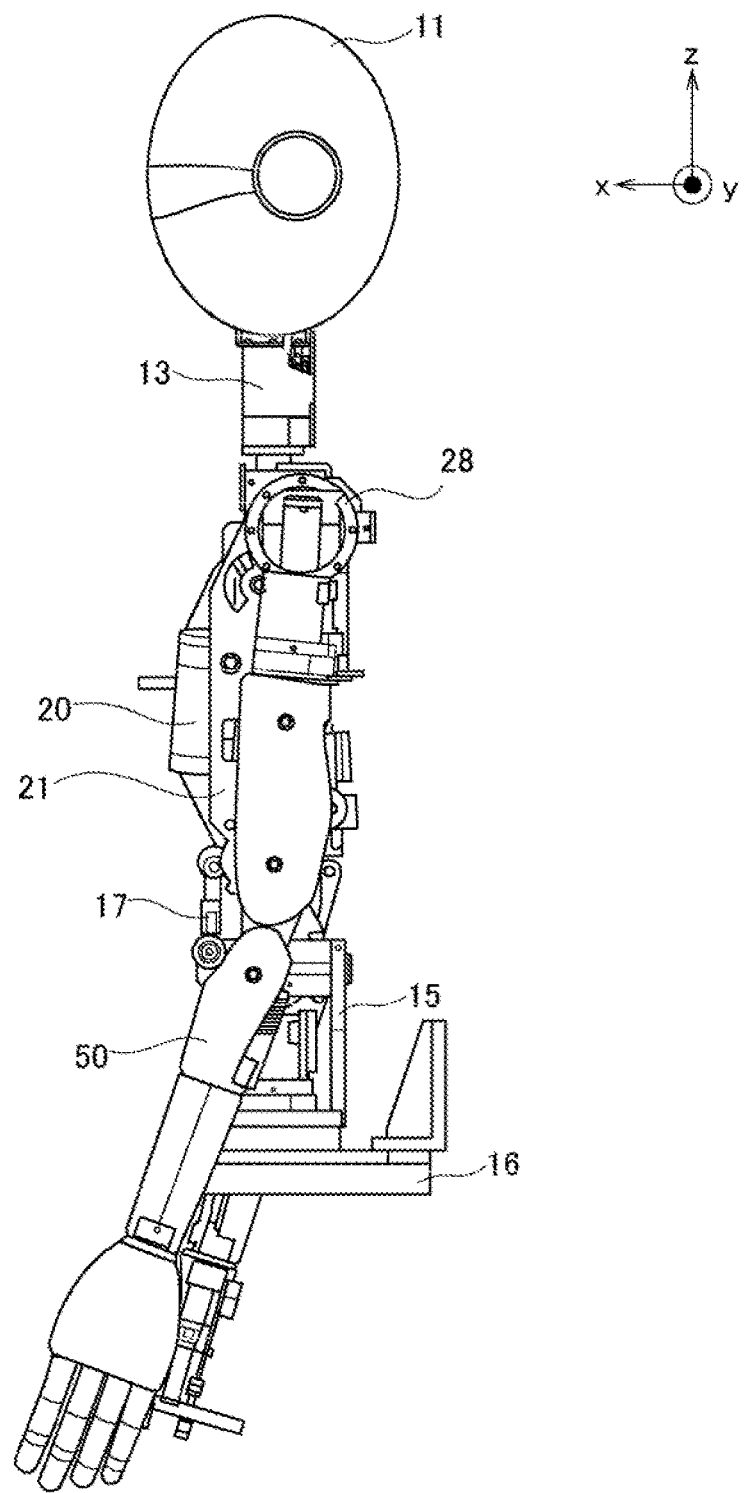

[Fig. 3]
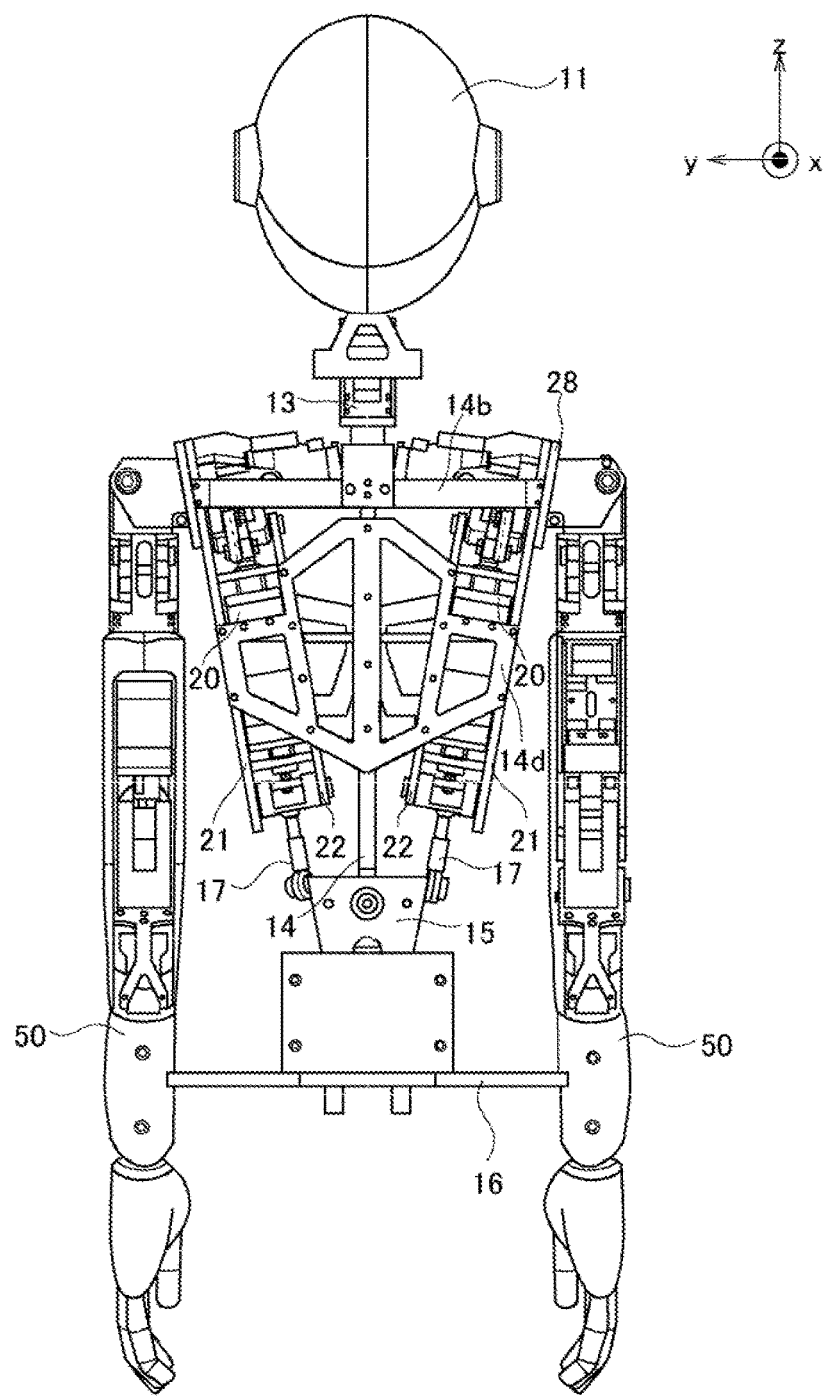

[Fig. 4]
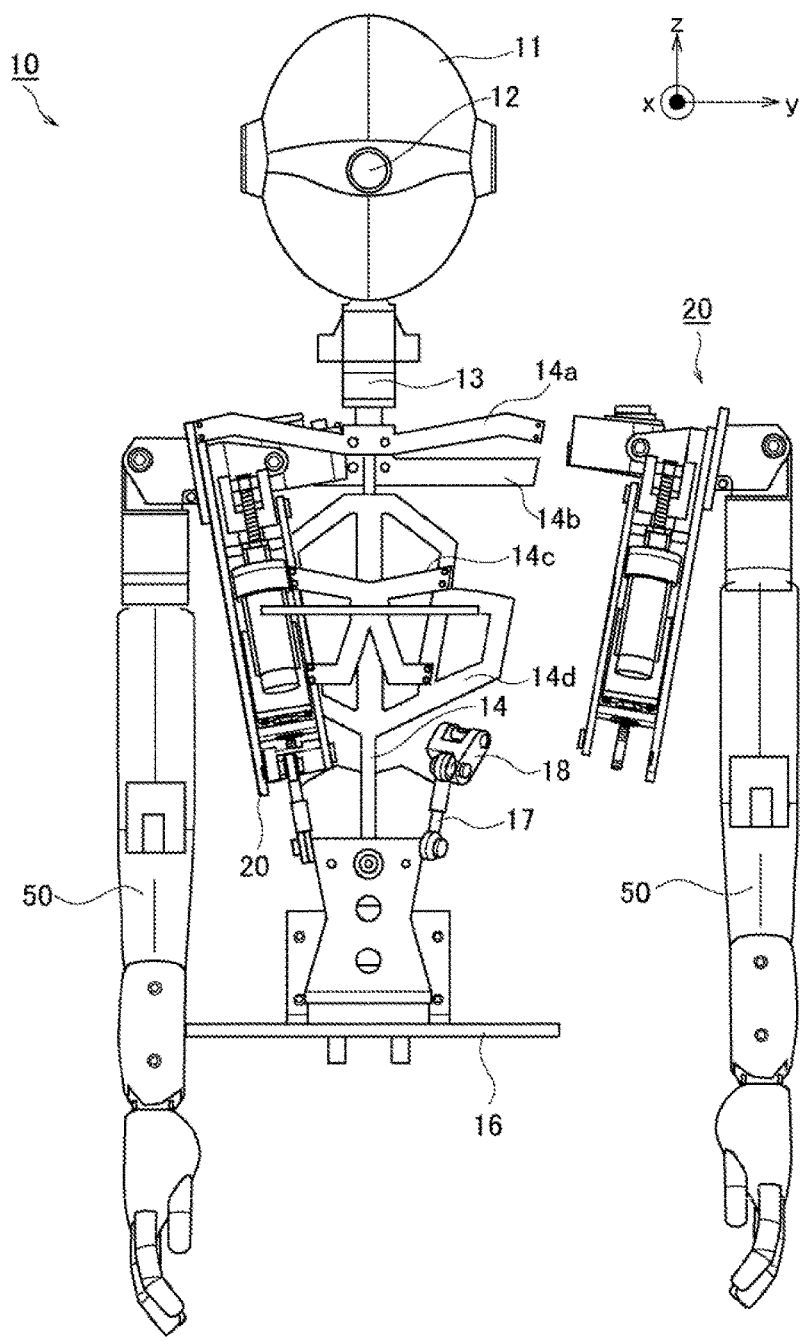

[Fig. 5]
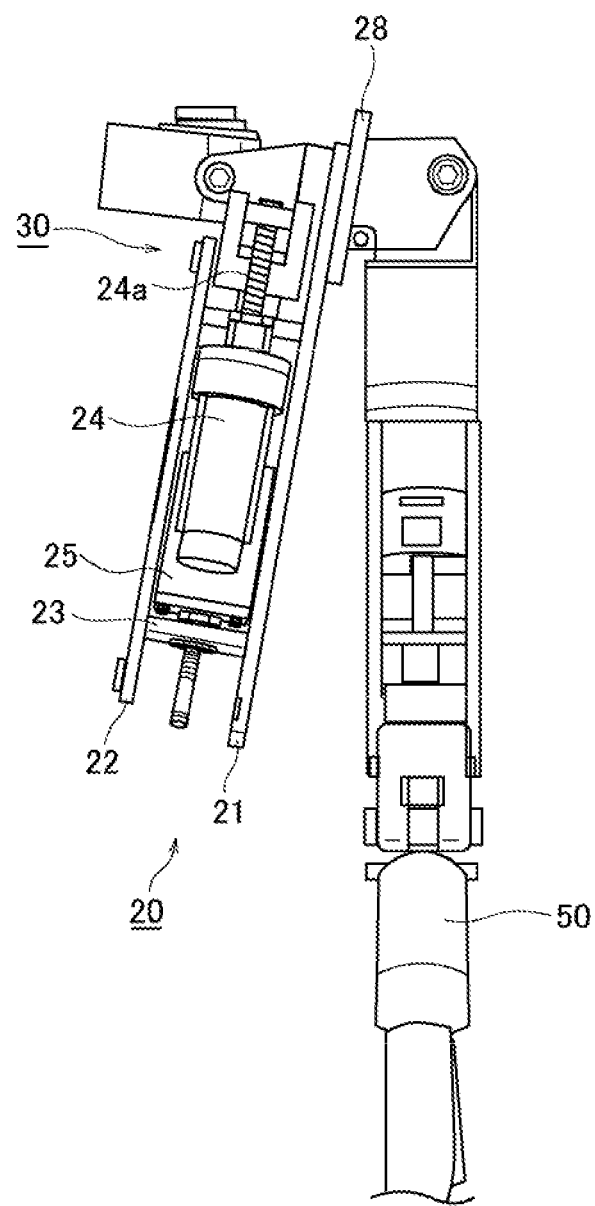

[Fig. 6]
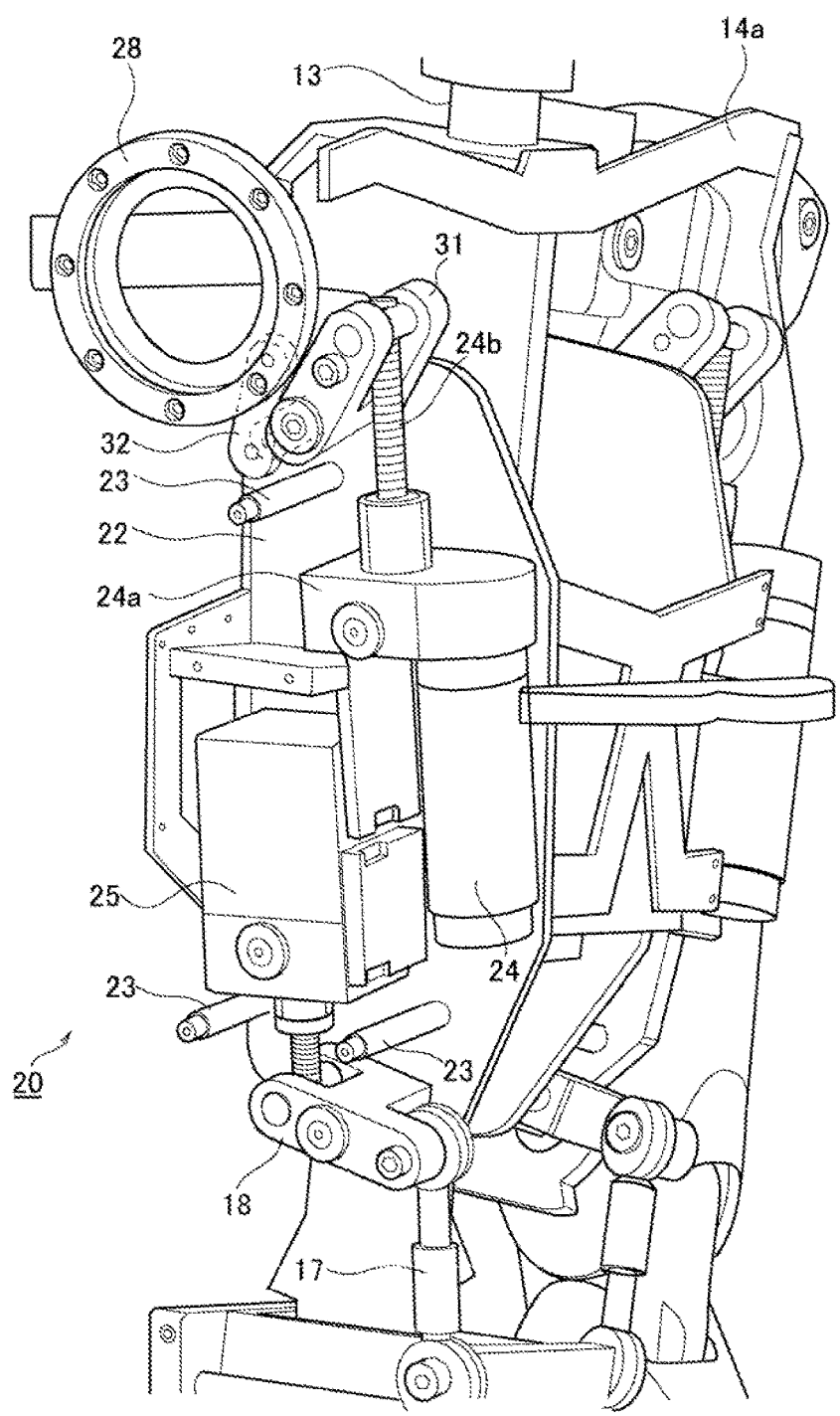

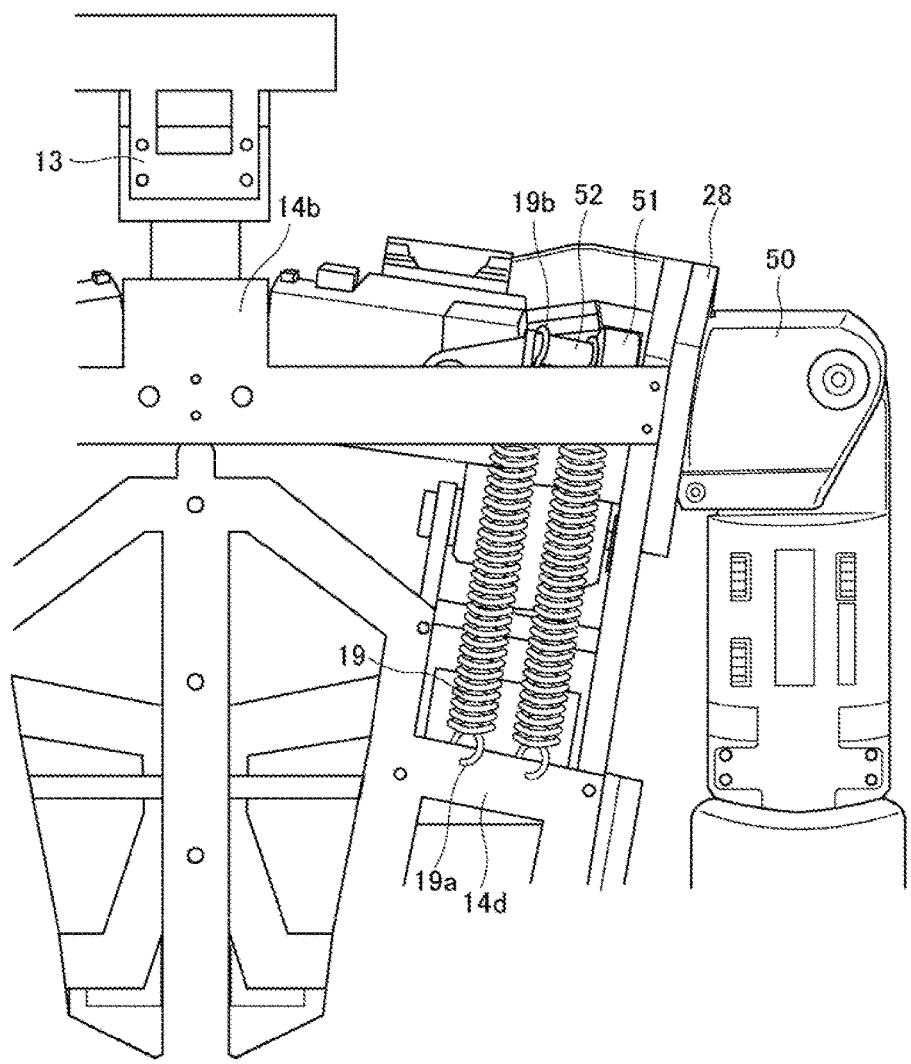
[Fig. 7]

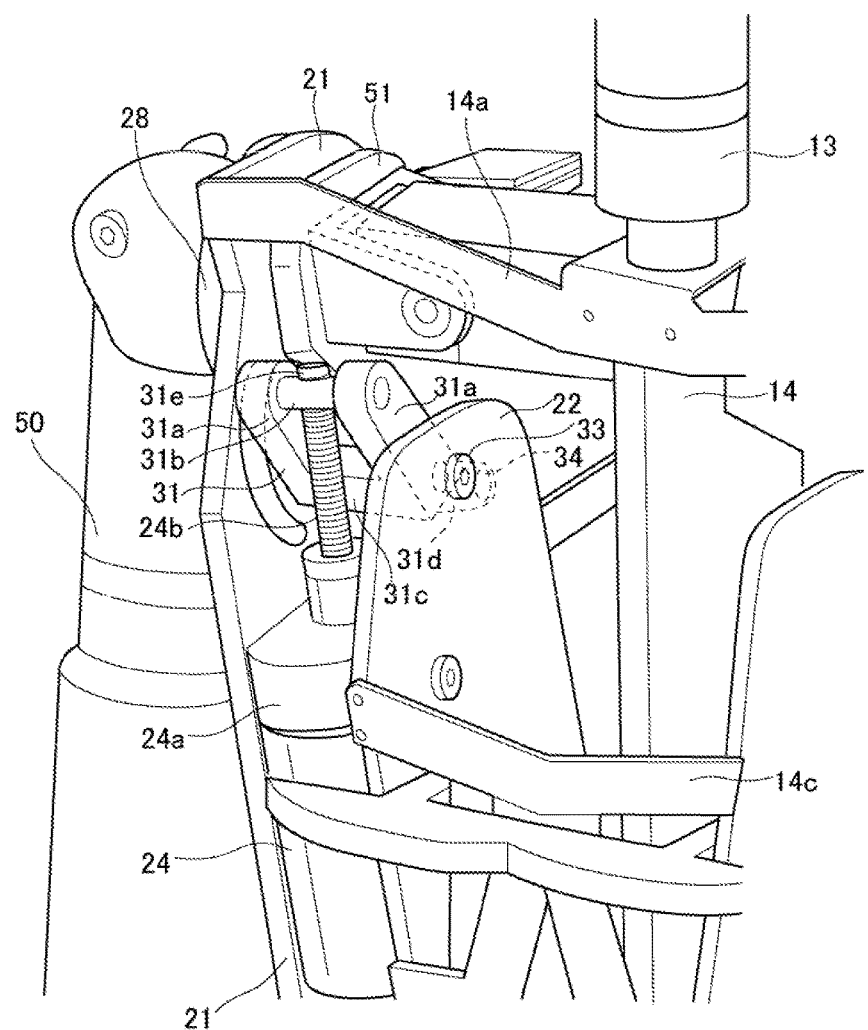
[Fig. 8]

[Fig. 9]
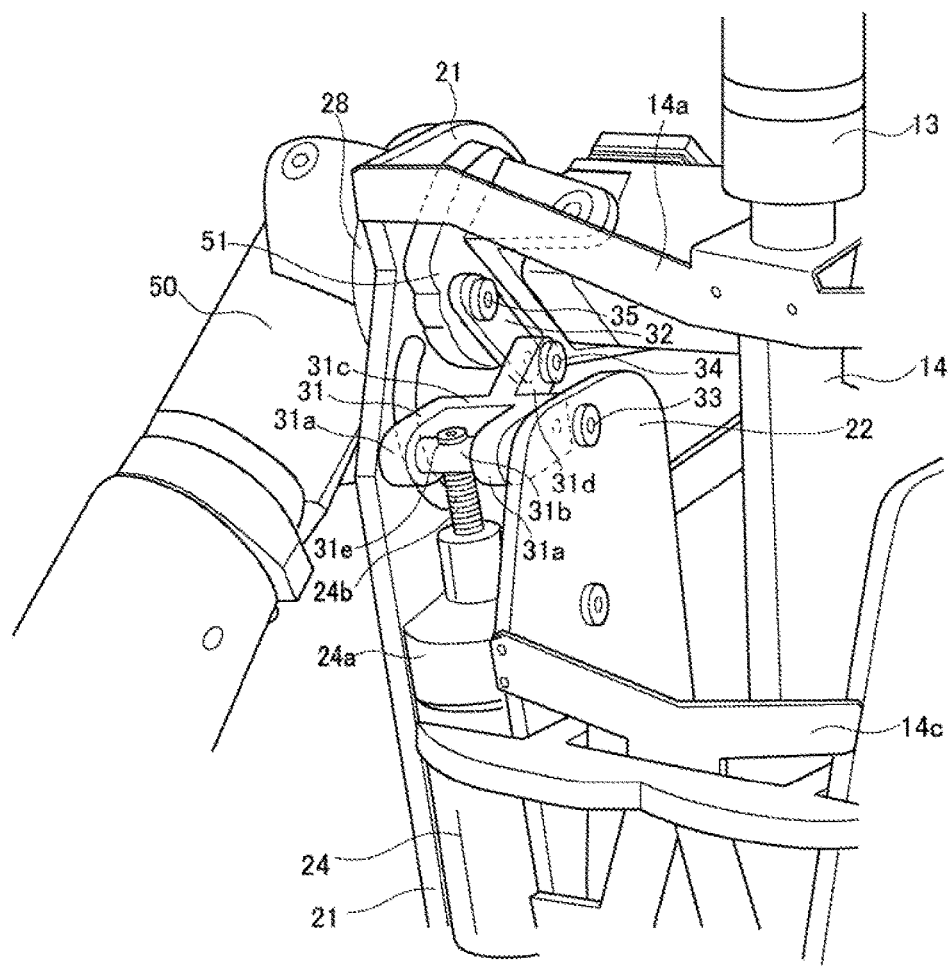

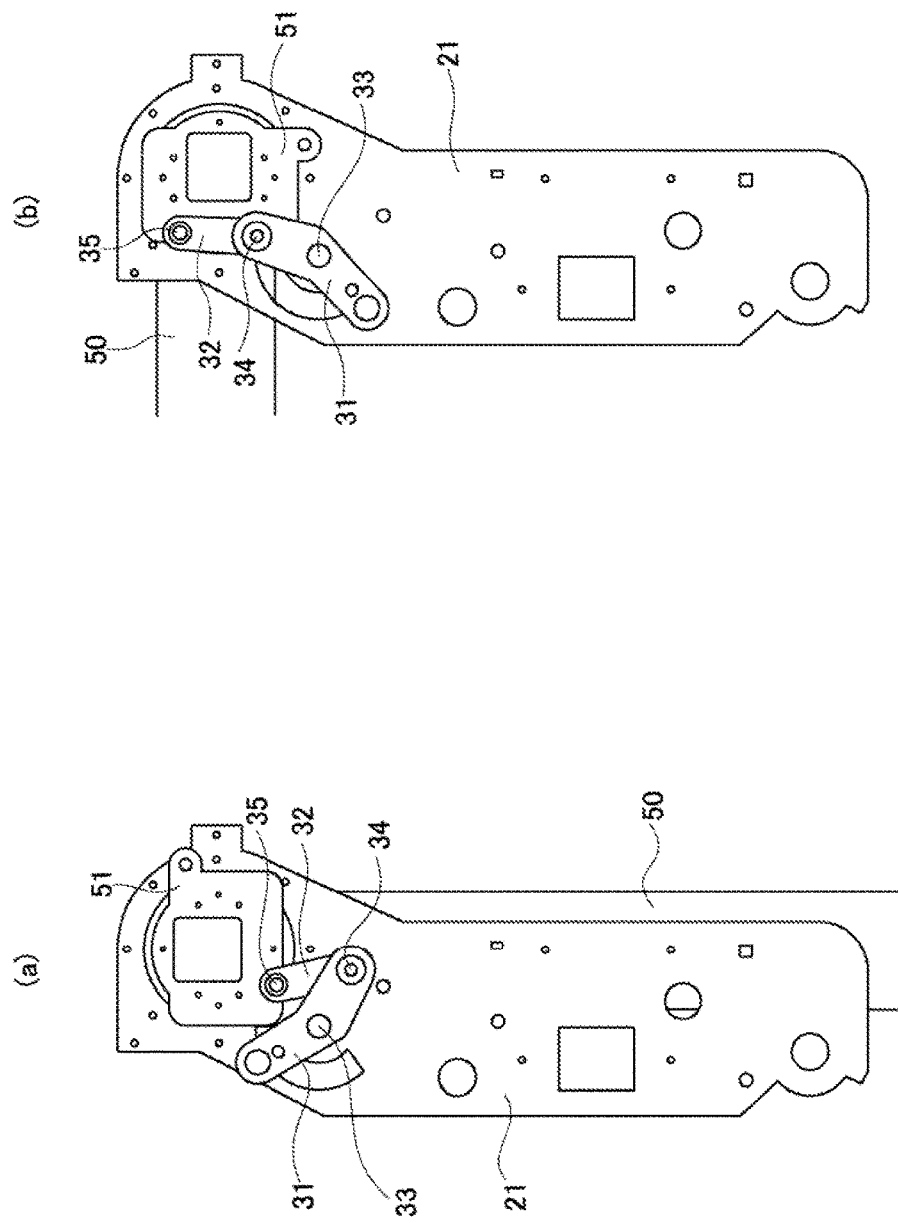

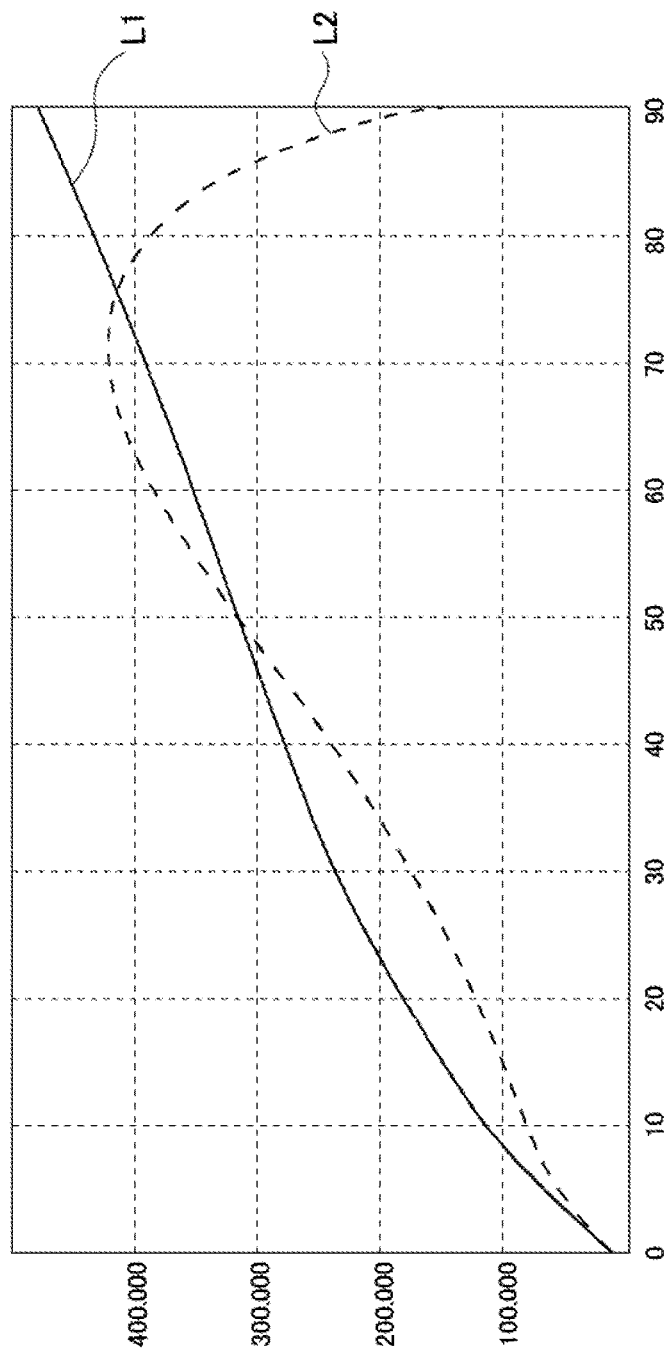
[Fig. 11]

SUPPORT STRUCTURE FOR AN UPPER HALF BODY OF A ROBOT

TECHNICAL FIELD

The present invention relates to a support structure for an upper half body of a robot.

BACKGROUND ART

In recent years, there have been actively made research and development of not only industrial robots but also consumer robots, which play various roles for peoples livelihood. Among such robots, human-like robots (humanoid robot) being able to walk in erect posture are expected to be able to substitute for actions of human beings. In such humanoid robots, many joint parts are provided for imitating actions or motions of a human being, and a variety of motions having a plurality of degrees of freedom in the joint parts are required. For that reason, many actuators for driving joint parts are mounted in an upper half body of a humanoid robot, and the weights thereof become large, so the load to be borne by a support structure for the upper half body is not small.

Here, for example, in a support structure for an upper half body of a robot shown in patent literature 1, a backbone part is stood vertically from a haunch bone part which is supported on two feet. Then, with respect to the backbone part, a horizontal support member extends to the right and left sides of the upper half body at the position of shoulder parts, and arm units of the robot are rotatably mounted on tip ends of the horizontal support member, respectively (see, in particular, FIG. 2A of the patent literature 1). Accordingly, the arm units of the robot will be supported in a state of being hung by the horizontal support member.

CITATION LIST

Patent Literature

[Patent Literature 1] Japanese patent laid-open publication No. 2012-148366

SUMMARY OF THE INVENTION

Technical Problem

As shown in the above-mentioned patent literature, in conventional technologies, there are many cases where arm units are rotatably mounted on a horizontal support member extending from a backbone part of a robot to its sides. In an upper half body of such a robot, the arm units of relatively large weights will be supported at a location away a predetermined distance from the backbone part. As a result, in order to support the moments of the arm units to a sufficient extent, it is necessary to keep the rigidity of the horizontal support member and the backbone part relatively high, so that the weight of the entire upper half body of the robot tends to increase. In addition, since the arm units are directly connected with a skeletal structure member (i.e., the horizontal support member) which forms the upper half body of the robot, the skeletal structure member will directly receive the loads from the arm units. From this point, too, an increase in the weight of the upper half body can not be avoided in order to ensure the strength against the loads.

In addition, the increase in the weight of the upper half body of the robot means that the load to be supported by a lower half body structure such as legs increases, and hence, it is not preferable from the strength side of the lower half body, the energy consumption side for driving the robot, etc.

The present invention has been made in view of the problems as mentioned above, and has for its object to provide a support structure for an upper half body of a robot which is able to reduce the weight of the upper half body of the robot.

Solution to Problem

In the present invention, in order to solve the aforementioned problem, a construction is adopted in which an arm unit and an actuator for driving the arm unit are mounted on a driving unit which can secure a relatively high rigidity, and the driving unit is mounted on an upper half body so as to function as a member supporting the upper half body of the robot. With this, the upper half body is supported by the driving unit itself, thus making it possible to attain an increase in the strength of the upper half body in an efficient manner.

Specifically, the present invention resides in a support structure for an upper half body of a robot which is provided with: a columnar backbone part extending in an upward direction from a haunch bone part of said robot; an upper half body support part connected to said backbone part and extending from said backbone part to a side of said robot; and a driving unit on which an arm unit of said robot is rotatably mounted and which is provided at least with a predetermined actuator for driving said arm unit to rotate from the outside of said arm unit. Then, said driving unit is connected to said upper half body support part and said haunch bone part at a first connection point on said upper half body support part which is away a predetermined distance from a connection point of said upper half body support part and said backbone part to a side thereof, and at a second connection point on said haunch bone part, respectively.

The support structure for an upper half body of a robot according to the present invention includes a structure for supporting at least the arm unit in the upper half body of the robot including the backbone part and the haunch bone part. Here, the haunch bone part is a skeletal structure part which receives the load of the upper half body of the robot, and, in general, the upper half body of the robot is arranged on the haunch bone part. Accordingly, on the haunch bone part, the backbone part, being the center of the upper half body, is arranged so as to extend upward. Here, note that an "upward direction" and a "downward direction" in the present invention are terms each representing a direction in which a gravity load acts, for example, a vertical direction. As one example, when the robot stands up from a mounting surface, a direction from the haunch bone part to the head side of the robot is the upward direction, and the opposite thereof is the downward direction.

In addition, in the upper half body of the robot, the upper half body support part is connected with the backbone part in such a manner as to extend to a side of the robot. This upper half body support part may extend from the backbone part to the opposite sides of the robot, or may extend therefrom to one side of the robot.

Here, the driving unit is provided with the predetermined actuator that drives the arm unit from the outside of the arm unit of the robot. It is considered that the arrangement of the predetermined actuator for driving the arm unit at a location outside the arm unit can decrease the moment of the arm unit to be driven to rotate, thus contributing to the reduction in the weight of the upper half body of the robot. Here, note that the driving unit needs to exhibit relatively high structural rigidity because of the inclusion of the predetermined actuator. Accordingly, based on the high rigidity of this entire driving unit, the driving unit is utilized in the present invention as a structural body for supporting the upper half body.

That is, as mentioned above, the driving unit is connected to the upper half body support part and the haunch bone part at the first connection point on the upper half body support part and at the second connection point on the haunch bone part. Thus, by connecting the driving unit in this manner, it becomes possible to utilize the rigidity possessed by the driving unit for the purpose of supporting the upper half body support part from the haunch bone part. Here, the first connection point is in a position away the predetermined distance from the backbone part in a side of the robot, and on the other hand, the second connection point is on the haunch bone part under the backbone part, as a consequence of which the distance between the backbone part and the second connection point becomes shorter than said predetermined distance. For that reason, in the upper half body of the robot, a support frame of a substantially triangular shape will be formed by the backbone part, the upper half body support part and the driving unit, so that the strength of the upper half body of the robot can be made stable. Furthermore, in the support frame, the structure of the driving unit itself is utilized as a part of the support frame, so it becomes possible to attain an increase in the strength of the upper half body of the robot, without unnecessarily making the weight thereof heavy.

Advantageous Effects of Invention

A support structure for an upper half body of a robot can be provided which makes it possible to reduce the weight of the upper half body of the robot.

BRIEF DESCRIPTION OF DRAWINGS

FIG. 1 is a front elevation of a robot to which a support structure according to the present invention is applied.
FIG. 2 is a side elevation of the robot shown in FIG. 1.
FIG. 3 is a rear elevation of the robot shown in FIG. 1.
FIG. 4 is a view showing a state where an arm unit and a driving unit are removed, in the robot shown in FIG. 1.
FIG. 5 is a view showing the driving unit removed in FIG. 4.
FIG. 6 is a view showing the construction of the inside of the driving unit, in the robot shown in FIG. 1.
FIG. 7 is a view showing a part of a rear surface of the robot shown in FIG. 1.
FIG. 8 is a first view showing an operating state of a linkage mechanism inside the driving unit in the robot shown in FIG. 1.
FIG. 9 is a second view showing an operating state of the linkage mechanism inside the driving unit in the robot shown in FIG. 1.
FIG. 10 is a first view explaining the operation of the linkage mechanism inside the driving unit in the robot shown in FIG. 1.
FIG. 11 is a second view explaining the operation of the linkage mechanism inside the driving unit in the robot shown in FIG. 1.

MODES FOR CARRYING OUT THE INVENTION

Hereinafter, specific modes or embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

<Construction of Robot 10>

Reference will be made to the overall construction of a robot 10 on which a support structure according to the present invention is mounted, based on FIGS. 1 through 3. FIG. 1 is a front elevation of the robot 10, FIG. 2 is a left side view of the robot 10, and FIG. 3 is a rear elevation of the robot 10. Here, note that in each of these figures, the internal structure of the robot 10 is shown in a state where a main body cover is omitted except for a left hand, for the sake of easy and clear understanding. Also, note that in this embodiment, assuming that the direction of advancement of the robot 10 is set as a positive or plus direction of an x axis, and that a left hand direction as viewed from the robot 10 is set as a positive or plus direction of a y axis, and that an antigravity direction in the robot 10 is set as a positive or plus direction of a z axis, the x axis is a roll axis, and the y-axis is a pitch axis, and the z-axis is a yaw axis. Accordingly, a rotation around the x axis becomes a roll motion, and a rotation around the y axis becomes a pitch motion, and a rotation around the z axis becomes a yaw motion. In addition, an upward direction in this embodiment is the positive or plus direction on the z axis, i.e., the antigravity direction, and on the other hand, a downward direction is the negative or minus direction of the z axis, i.e., the gravity direction. A left and right direction is a left and right direction when viewed from the robot 10, wherein the positive or plus direction on the y axis becomes a left direction, and a negative or minus direction on the y axis becomes a right direction.

The robot 10 is a humanoid robot and has a body which imitates a skeletal structure of a human being. Schematically, the skeletal structure of the upper half of the body of the robot 10 (hereinafter, referred to simply as an "upper half body skeletal structure") is formed of a backbone part 14 extending in the z axis direction in FIG. 1 and including various kinds of later-mentioned bone parts 14a-14d formed of sheet metal, a haunch bone part 15 connected with the backbone part 14 so as to support it, and a pelvic part 16 which further support the haunch bone part 15 and to which an unillustrated pair of legs of the robot 10 is connected. Then, the neck 13 of the robot 10 is connected to the backbone part 14, and further, a head 11 is arranged on the neck 13. Here, note that a camera 12 for photographing outside is mounted on the head 11. By the connection of the head 11 with the backbone part 14 through this neck 13, it becomes possible for the head 11 to perform a roll motion and a yaw motion with respect to the backbone part 14, but the internal structure of the robot for these motions does not make the core of the present invention, so a detailed explanation thereof is omitted in this description.

In addition, in the robot 10, driving units 20 for managing the drive of the upper half of the body are arranged corresponding to an upper right half body and an upper left half body, respectively. Here, as shown in FIG. 4, an anterior clavicular part 14a at the front side of the robot and a posterior clavicular part 14b at the back side of the robot are connected to the backbone part 14 at locations positioned in shoulder parts of the robot 10 in such a manner as to extend toward the sides of the robot 10. Moreover, an anterior sternal part 14c at the front side of the robot and a posterior sternal part 14d at the back side of the robot are connected to the backbone part 14 at locations positioned in a chest part (a portion lower than the shoulder parts) of the robot 10 similarly in such a manner as to extend toward the sides of the robot 10. Predetermined spaces are formed by these bone parts 14a-14d and the backbone part 14 at the right and left sides of the backbone part 14, respectively, in the upper half of the body of the robot 10. The driving units 20 are arranged so as to be received in the predetermined spaces at the right and left sides, respectively, and the driving units 20 are connected with respect to the individual bone parts 14a-14d. As a result of this, the two driving units 20 are mounted in the interior of the robot 10. The bone parts 14a-14d are formed of flat plate-shaped sheet metal thinner than the thickness of the backbone part 14, so the mounting of the driving units 20 with respect to the backbone part 14 will be carried out relatively resiliently. These bone parts 14a-14d correspond to an upper half body support part of the present invention, and in particular, the bone parts 14a, 14c correspond to a front upper half body support part of the present invention, and the bone parts 14b, 14d correspond to a rear upper half body support part of the present invention. Here, note that the details of the mounting of the driving units 20 will be described later.

<Construction of the Driving Units 20>

In FIG. 4, there is shown a state in which an arm unit 50 at the left-hand side of the robot 10 and the corresponding driving unit 20 for the upper left half body are removed in unison from the upper half body skeletal structure of the robot 10. Thus, the driving units 20 are each constructed so as to be removable from the upper half body skeletal structure of the robot 10 together with the corresponding arm unit 50, whereby assembly efficiency and maintenance of the robot 10 are maintained in a suitable manner. In each of the driving units 20, a rotational driving mechanism comprising a link mechanism is mounted, and an output from an actuator is transmitted to the corresponding arm unit 50 by this rotational driving mechanism, whereby rotational driving of the arm unit 50 will be carried out. Hereinafter, based on FIG. 5 and FIG. 6, the details of the rotational driving mechanisms will be explained. Here, note that the driving unit 20 for the upper left half body of the robot 10 is disclosed or shown in FIG. 5, and on the other hand, a detailed structure of the driving unit 20 for the upper right half body of the robot 10 is disclosed in FIG. 6. Also, note that in FIG. 6, in order to show the interior of the driving unit 20, a part of the construction thereof (the construction of an outer base plate 21, etc., to be described later) is omitted. In addition, in this description, the driving unit 20 for the upper left half body and the driving unit 20 for the upper right half body have the same construction, and so, an explanation given based on FIG. 5 and FIG. 6 is applied to the driving units 20 and the rotational driving mechanisms in the interiors thereof at the opposite sides.

Each driving unit 20 has an accommodation space which is defined by an outer base plate 21 and an inner base plate 22 connected to the upper half body skeletal structure of the robot 10, and by a spacer 23 arranged between both of the base plates. In a state where an arm unit 50 is connected to the corresponding driving unit 20, the outer base plate 21 is a base plate arranged at the outer side of the robot 10, i.e., at a side close to the arm unit 50, and corresponds to a first base member according to the present invention. In addition, the inner base plate 22 is a base plate arranged inside the robot 10, and corresponds to a second base member of the present invention. Here, note that a support member 28 for supporting the arm unit 50 so as to be free to rotate with respect to the pitch axis is mounted on the outer base plate 21, so that the arm unit 50 is connected to the side of the driving unit 20 through the support member 28. For this support member 28, it is preferable to adopt a support member which can support loads in all directions, such as a radial road, an axial load, etc., by means of one bearing, in consideration of the point that the arm unit 50 of the robot 10 having a relatively large moment is supported within a limited space volume. For example, it is possible to adopt a cross roller ring manufactured by THK CO., LTD.

Then, the spacer 23 is a rod-shaped member which has a length defining the interval of both the base plates. The construction formed by the outer base plate 21, the inner base plate 22 and the spacer 23 is, so to speak, to form the housing of the driving unit 20, wherein this housing is fixed to the upper half body skeletal structure of the robot 10, and three actuators 24, 25 and a linkage mechanism 30 related to the actuator 24 are arranged there. Here, note that the actuators 24, 25 correspond to predetermined actuators of the present invention. In particular, the actuator 24 corresponds to an arm unit pitching actuator of the present invention, and the actuator 25 corresponds to a haunch bone part driving actuator of the present invention.

First, the actuator 24 will be explained. The actuator 24 is a linear motion actuator which has a servo-motor, a main body 24a, and an output shaft 24b performing linear movement in the axial direction of the actuator, and is fixed to the outer base plate 21 and the inner base plate 22. The output shaft 24b has a spiral thread groove formed on the outer peripheral surface thereof, and a ball screw nut (not shown) threadedly engaged with the thread groove of the output shaft 24b is received in the main body 24a in such a state that only rotation thereof around an axis line of the main body is permitted. Then, the servo-motor is connected with the main body 24a so as to rotate the ball screw nut, and the movement of the ball screw nut in the axial direction is limited within the main body 24a, so that the output shaft 24b is caused to perform rectilinear movement, i.e., linear motion in the axial direction by the drive of the servo-motor.

The output shaft 24b of the actuator 24 is connected to a first link unit 31 among the first link unit 31 and a second link unit 32 which together constitute the linkage mechanism 30. Here, note that this linkage mechanism 30 corresponds to the above-mentioned rotational driving mechanism. Then, the first link unit 31 has two wall portions 31a extended in the same direction from the opposite ends of a base portion 31c, as shown in FIG. 8 and FIG. 9 to be described later, and a bridge 31b connecting both the wall portions 31a with each other is arranged in such a manner as to be parallel to the base portion 31c. This base portion 31c is supported by a bearing in such a manner as to be free to rotate with respect to the outer base plate 21 and the inner base plate 22, thereby forming a first support point 33. In addition, the output shaft 24b of the actuator 24 is connected to the bridge 31b in such a manner that the direction thereof with respect to the first link unit 31 becomes variable, wherein a connection point between the actuator output shaft and the bridge is denoted by 31e. Moreover, a tail portion 31d extending from the base portion 31c is arranged at the opposite side of the bridge 31b across the base portion 31c. The extending direction of the tail portion 31d is not on a straight line connecting between the connection point 31e on the bridge 31b and the first support point 33, but is a direction in which the actuator 24 is not arranged with respect to the straight line, i.e., a direction in which a third support point 35 to be described later is located. This second link unit 32 is supported by a bearing in such a manner as to be free to rotate at an end of the tail portion 31d (i.e., an end at the opposite side of a connection portion thereof with the base portion 31c), thereby forming a second support point 34.

In this manner, the first link unit 31 is formed as a link body which comprises the wall portions 31a, the bridge 31b, the base portion 31c and the tail portion 31d. Then, the first link unit 31 is such that when the first support point 33 supporting the link body of the first link unit 31 for free rotation is taken as a reference, the bridge 31b to which the output shaft 24b of the actuator 24 is connected is located at one side of the first support point 33, and the tail portion 31d to which the second link unit 32 is connected is located at the other side of the first support point 33. For that reason, a point on which the output of the actuator 24 acts, i.e., the connection point 31e at which the output of the actuator 24 is inputted to the first link unit 31, and a point at which a force is transmitted through the first link unit 31 to the side of the second link unit 32, i.e., the second support point 34 at which the output from the actuator 24 is outputted to the side of the second link unit 32, have a correlation where they rock like a seesaw on the basis of the first support point 33, and in addition, the first link unit 31 is formed as a rocking link. More specifically, the first link unit 31 is formed in the following manner: when the connection point 31e moves in the upward direction, the second support point 34 will move in the downward direction, and on the contrary, when the connection point 31e moves in the downward direction, the second support point 34 will move in the upward direction. Thus, by forming the first link unit 31 as the rocking link, it is possible to suppress the size of the mechanism required to transmit the output of the actuator 24, in particular the length dimension thereof. In addition, it also becomes possible to attain amplification of the output of the actuator 24 by making use of the seesaw shape of the first link unit 31, and this also contributes to the reduction in size of the actuator 24.

Subsequently, the second link unit 32 is rotatably connected at its one end with the tail portion 31d of the first link unit 31 at the second support point 34, as mentioned above, and is further supported at its other end by a bearing in such a manner as to be free to rotate with respect to a plate 51 connected with an end of the arm unit 50 of the robot 10, as shown in FIG. 9 to be described later, thus forming a third support point 35. Thus, the second link unit 32 is formed so as to have a plate-shaped main body including the second support point 34 and the third support point 35, and the second link unit 32 serves to transmit a force propagated from the first link unit 31 to the plate 51. This plate 51 is a plate connected with the end of the arm unit 50 rotatably mounted through the support member 28, and rotates together with the arm unit 50 in accordance with the rotation of the arm unit 50 in the pitch direction. Then, the support point 35 is located in a place which is shifted by a predetermined distance from the center of rotation in the pitch direction of this arm unit 50, and the force transmitted to the plate 51 through the first link unit 31 and the second link unit 32 becomes a driving force which causes the arm unit 50 to rotate in the pitch direction.

In this manner, the driving force of the actuator 24 is transmitted to the arm unit 50 by means of the linkage mechanism 30 composed of the first link unit 31 and the second link unit 32, whereby the rotary motion in the pitch direction of the arm unit 50 will be caused. Then, the arm unit 50 is supported by the support member 28 on the outer base plate 21, and the first link unit 31 is rotatably supported on the outer base plate 21 and the inner base plate 22, so that the directions of rotation of the first link unit 31 and the second link unit 32 become the same direction as the rotation in the pitch direction of the arm unit 50.

Next, the actuator 25 will be explained. The actuator 25 is also a linear motion actuator, as in the case of the actuator 24, and is fixed to the outer base plate 21 and the inner base plate 22. The output shaft of the actuator 25 is connected to one end side of a rocking link part 18 which is rotatably mounted on the outer base plate 21 and the inner base 22 through the support point 18a. Then, to the other end side of the rocking link part 18, a transmission link part 17 is rotatably connected through a support point 18b, and the transmission link part 17 is further connected to the haunch bone part 15. This rocking link part 18 has a seesaw shape as in the above-mentioned first link unit 31, and hence, the size of the mechanism required to transmit the output of the actuator 25, in particular the length dimension thereof, can be suppressed, and further, it also becomes possible to attain amplification of the output of the actuator 25, and this also contributes to the reduction in size of the actuator 25.

In the upper right and left halves of the body of the robot 10, the output of the actuator 25 is transmitted to the haunch bone part 15, whereby the upper half body of the robot 10 will be driven to rotate in the roll direction and in the yaw direction with respect to the pelvic part 16 due to an unillustrated detailed construction of the haunch bone part 15. Here, note that a construction for the rotational driving of the upper half body with respect to this pelvic part 16 does not make the core of the present invention, so a detailed explanation thereof is omitted.

In addition, only the actuator 25 is included in the driving unit 20, and the rocking link part 18 and the transmission link part 17, which are links related to the actuator 25, are not included in the driving unit 20 (refer to a state where the driving unit has been removed, as shown in FIG. 4). This is because when the connection between the transmission link part 17 and the haunch bone part 15 is removed or disconnected at the time of removal of the driving unit 20, the rocking link part 18 and the transmission link part 17 will protrude from the housing of the driving unit 20, and handling thereof will become difficult. Of course, the driving unit 20 may be removed from the upper half body skeletal structure, so that the rocking link part 18 and the transmission link part 17 may be included in the driving unit 20.

Then, the rear structure of the robot 10 will be explained based on FIG. 7. FIG. 7 is a view showing the rear structure of the driving unit 20. As shown in FIG. 7, there is arranged a spring mounting portion 52 extending from on the plate 51 along a shoulder width direction of the robot 10. Two springs 19 for applying an urging force to the posterior sternal part 14d are mounted on this spring mounting portion 52. The connection positions of the springs 19 in the posterior sternal part 14d are denoted by 19a.

The spring mounting portion 52 is on the plate 51 which performs pitch rotation together with the arm unit 50, and the connection position 19a is at the side of the posterior sternal part 14d which forms the upper half body skeletal structure of the robot 10, so the urging force by the springs 19 will produce a torque which contributes to the pitch rotation of the arm unit 50. This urging force by the springs 19 will be described later.

<Support Structure by Driving Unit 20

As mentioned above, each driving unit 20 is connected to the anterior clavicular part 14a and the posterior clavicular part 14b, respectively, in a state where the actuators 24, 25 are received in an accommodation space defined by the outer base plate 21 and the inner base plate 22 at a top front location and a top rear location. Further, the driving unit 20 is connected to the anterior sternal part 14c and the posterior sternal part 14d at a central front location and at a central rear location thereof, respectively. The driving unit 20 is connected at its lower portion with the haunch bone part 15 through the output shaft of the actuator 25, the rocking link part 18 and the transmission link part 17. Then, connection points of the bone parts 14a-14d with the outer base plate 21 and the inner base plate 22 of the actuator 20 each correspond to a first connection point of the present invention, and a connection point (support point 17a) thereof with the haunch bone part 15 through the rocking link part 18, etc., corresponds to a second support point of the present invention.

By such a mode of connection of the driving unit 20 with the upper half body skeletal structure, the driving unit 20 is connected with the individual bone parts 14a-14d corresponding to the upper half body support part, so as to support them from below. Then, as seen from figures, too, the connection points, corresponding to the first connection points, between the driving unit 20 and the individual bone parts 14a-14d are at locations away from the backbone part 14 to one side of the robot 10 by a distance corresponding to a shoulder length of the robot 10, and are positioned at the side of the robot 10 further away from the support point 17a. In addition, when based on the fact that the support point 17a corresponding to the second connection point is a connection point on the haunch bone part 15 connected to the backbone part 14, a substantially triangular support frame will be formed by the first connection points, the second connection point, and the connection points of the individual bone parts 14a-14d and the backbone part 14. That is, the driving unit 20 itself will be included in one side of this support frame.

Here, as seen from figures, too, in this support frame, the driving unit 20 is in a state where the outer base plate 21 and the inner base plate 22 extends between the first connection points and the second connection point in their longitudinal directions. Because the outer base plate 21 and the inner base plate 22 are also base plates to which the actuators 24, 25 are fixed, the thickness of each of both the base plates is made to be suitably thick so that they should function as a housing for the driving unit 20. Accordingly, the rigidity of each of the outer base plate 21 and the inner base plate 22 is set relatively high.

Accordingly, when each of the base plates 21, 22 of the driving unit 20 is included in one side of the above-mentioned support frame, the rigidity of each of the base plates 21, 22 can be utilized as it is for the support of the upper half body skeletal structure of the robot 10, in particular, the bone parts 14a-14d. This means that an increase in the strength of the upper half body of the robot 10 can be attained even without the provision of a special support structure for the support of the upper half body skeletal structure, in other words, it is possible to suppress the weight of the upper half body from being increased for the increase in the strength of the upper half body of the robot 10.

Moreover, each arm unit 50 is not directly connected with the bone parts 14a-14d, but is mounted on the outer base plate 21 of the driving unit 20. Then, because the bone parts 14a-14d are formed of the sheet metal, as mentioned above, they serve to support the driving unit 20 in a resilient manner. Thus, by supporting the driving unit 20 in a resilient manner, a part of the load from the arm unit 50 can be absorbed by the resiliency of the bone parts 14a-14d. For that reason, the load to be supported by the support member 28 with the arm unit 50 mounted on the outer base plate 21 will be reduced, so there can be used the support member 28 with a relatively low permissible load such as, for example, a cross roller ring of which the permissible radial load and the permissible axial load is relatively low. As a consequence of this, the reduction in size of the support member 28 can be attained, and from this, too, the increase in the weight of the upper half body of the robot 10 can be suppressed.

Further, from the point of view of suppressing the increase in the weight of the upper half body of the robot 10, it can also be said that an arrangement is useful in which the actuator 24 for driving the arm unit 50 is connected with the upper half body skeletal structure in a state of being fixedly received in the above-mentioned accommodation space which is formed in the driving unit 20. Due to the actuator 24 being arranged in the outside of the arm unit 50, the weight of the arm unit 50 can be reduced in comparison with the case where the actuator 24 is arranged in the inside of the arm unit 50. Because the arm unit 50 is a member which is driven to rotate, the reduction in the weight thereof results in a decrease in the moment of the arm unit 50, as well as a decrease in load at the time of rotational driving thereof. As a result, it becomes unnecessary to increase the load carrying capacity of the upper half body skeletal structure to a large extent, and thus, this is considered to contribute to suppressing an increase in the weight of the upper half body. Here, note that in order to drive the arm unit 50 to rotate in the state where the actuator 24 is arranged in the outside of the arm unit 50, an arrangement is extremely useful in which an output from the linear motion output shaft of the actuator 24 is transmitted to the arm unit 50 by the operation of the linkage mechanism 30 which will be described later.

<Operation of the Link Mechanism 30>

The linkage mechanism 30 is composed of the first link unit 31 and the second link unit 32 as mentioned above, and serves to transmit the driving force of the actuator 24 to the plate 51 connected with the arm unit 50, whereby the arm unit 50 will be driven to rotate in the pitch direction. Then, the details of the operation of this linkage mechanism 30 will be explained based on FIG. 8, FIG. 9 and FIG. 10.

FIG. 8 shows a state inside the driving unit 20 around the linkage mechanism 30 in a state where the arm unit 50 is in the most downward or lowermost position in which it extends in the most downward direction along the gravity component in a state where the arm unit 50 extends in the vertically downward direction, i.e., in a state where the arm unit 50 is rotatably supported by the support member 28. On the other hand, FIG. 9 shows a state inside the driving unit 20 around the linkage mechanism 30 in a state where the arm unit 50 is in a horizontal raised position in which it is caused to rise from the most downward or lowermost position against the gravity component in a state where the arm unit 50 extends in the horizontal direction, i.e., in a state where the arm unit 50 is rotatably supported by the support member 28. That is, FIG. 8 represents a state where the gravity load on the actuator 24 by the self weight of the arm unit 50 becomes a minimum, and FIG. 9 represents a state where the gravity load becomes a maximum.

Moreover, FIG. 10 shows the individual units constituting the linkage mechanism 30 each in a state of being projected on a z-y plane so as to make it easy to grasp the state of each link unit. For that reason, the first link unit 31 is represented by a recumbent V shape or a doglegged shape in which a straight line connecting between the connection point 31e and the first support point 33 and a straight line connecting between the first support point 33 and the second support point 34 bend with respect to each other. Here, note that specifically, the left figure (a) of FIG. 10 shows the state of the linkage mechanism 30 in the case of the arm unit 50 being in the lowermost position, as shown in FIG. 8, and the right figure (b) of FIG. 10 represents the state of the linkage mechanism 30 in the case of the arm unit 50 being in the horizontal raised position, as shown in FIG. 9.

Here, the operation of the linkage mechanism 30 in the case of the arm unit 50 being driven to rotate from the lowermost position to the horizontal raised position in the robot 10 will be explained. In cases where the arm nit 50 is in the lowermost position in the robot 10, the output shaft 24b of the actuator 24 is in a state of being located at the most upward or uppermost position inside the driving unit 20, as shown in FIG. 8. Thus, as shown in (a) of FIG. 10, the second support point 34 is in a state where it is located at the most downward or lowermost position which the second support point 34 can take. For that reason, being influenced by the position of this second support point 34, there occurs a state where the second link unit 32 has drawn in the plate 51 to the downward direction, and hence, the lowermost position of the arm unit 50 through the state of the plate 51 shown in (a) of FIG. 10 will be decided.

In this manner, when the output shaft 24b is drawn into the main body 24a from the state shown in (a) of FIG. 8 under the drive of the actuator 24 (i.e., when the output shaft 24 moves linearly to the downward direction in the robot 10), the first link unit 31 will rotate around the first support point 33 in a counter clockwise direction, in (a) of FIG. 10. That is, due to the downward linear movement of the output shaft 24b, the connection point 31e moves in the downward direction, and at the same time, the second support point 34 moves in the upward direction. As a result, the second link unit 32 will push out the plate 51 in a clockwise direction, and hence, in FIG. 10, the arm unit 50 will rotate and rise in the clockwise direction in accordance with the rotation of the plate 51, whereby it will arrive at the horizontal raised position shown in (b) of FIG. 10.

Here, in the process of the rise due to rotation of this arm unit 50, attention is focused on an angle θ (hereinafter, referred to as an "interlink angle") which is formed by a straight line connecting between the first support point 33 and the second support point 34 (hereinafter, referred to as a "first straight line"), and a straight line connecting between the second support point 34 and the third support point 35 (hereinafter, referred to as a "second straight line"). Because the first support point 33 is formed between the outer base plate 21 and the first link unit 31, and between the inner base plate 22 and the first link unit 31, the position of the first support point 33 remains unchanged with respect to the outer base plate 21 or the like, irrespective of the state of the first link unit 31. Then, as the first link unit 31 rotates in the counter clockwise direction from the state shown in (a) of FIG. 10, the second support point 34 goes up around this first support point 33, and the interlink angle θ, being an acute angle at the beginning, exceeds 90 degrees and comes to an obtuse angle, and then it becomes an angle close to 180 degrees in the final state shown in (b) of FIG. 10. That is, due to the counter clockwise rotation of the first link unit 31, the interlink angle θ gradually opens so as to approach 180 degrees, and the third support point 35 goes up so as to separate more from the first support point 33.

As a result, in the state where the arm unit 50 has risen to the horizontal, as shown in (b) of FIG. 10, the first straight line connecting between the first support point 33 and the second support point 34 and the second straight line connecting between the second support point 34 and the third support point 35 will extend substantially on a straight line and along the z-axis. At this time, the gravity load by the gravity component of the arm unit 50 becomes the maximum, but the three support points 33, 34, 35 in the linkage mechanism 30 are located on the first support point 33 substantially in alignment with each other in a straight line. For that reason, most of the gravity load transmitted from the arm unit 50 can be supported at the first support point 33 which is supported by the outer base plate 21, etc., thus making it possible to reduce the load transmitted to the side of the actuator 24 through the connection point 31e.

Moreover, in the linkage mechanism 30, in cases where the arm unit 50 is in a position in the vicinity of the horizontal raised position, the shapes and dimensions of the first link unit 31 and the second link unit 32 are decided so that the ratio of the amount of rotation of the plate 51 connected with the arm unit 50 with respect to the amount of displacement of the output shaft 24b of the actuator 24 becomes smaller, in comparison with the case where the arm unit 50 is in a position in the vicinity of the lowermost position. As a result of this, a speed reduction ratio, which is the ratio of the amount of displacement of the arm unit 50 with respect to the amount of displacement of the servo-motor mounted on the actuator 24, will be set to be larger, as the arm unit 50 approaches the horizontal raised position. For that reason, in the case where the arm unit 50 is in the vicinity of the lowermost position, the speed reduction ratio is relatively small, but the gravity load by the arm unit 50 is also small, so the degree of influence with respect to the actuator 24 can be kept small. On the other hand, in the vicinity of the horizontal raised position in which the gravity load by the arm unit 50 becomes relatively large, by making the speed reduction ratio larger, the degree of influence of the gravity load by the arm unit 50 to the actuator 24 can be reduced as much as possible, as a consequence of which it is possible to attain the reduction in size of the actuator 24.

In addition, in the robot 10, application of an urging force by means of the springs 19 is carried out, as shown in FIG. 7. This will be explained below based on FIG. 11. FIG. 11 shows the change over time of the gravity load by the arm unit 50 with respect to the angle of rotation of the arm unit 50, and the change over time of the urging force of the springs 19, by means of lines L1, L2, respectively. Here, note that on the axis of abscissa in FIG. 11, the angle of rotation in the case of the arm unit 50 being in the lowermost position (i.e., in the case of the state shown in (a) of FIG. 10) is 0 degrees, and the angle of rotation in the case of the arm unit 50 being in the horizontal raised position (i.e., in the case of the state shown in (b) of FIG. 10) is 90 degrees. In addition, the urging force of the springs 19 is applied in a direction in which torque for rising and rotating the arm unit 50 is generated in a range of angle of rotation shown in FIG. 11.

Here, as the arm unit 50 rotates and rises from the lowermost position to the horizontal raised position, the gravity load increases gradually, as can be seen from the line L1. At this time, as can be seen from the line L2, the urging force of the springs 19 is as follows: the mounting position and the spring constant of each spring are decided so that the urging force thereof becomes larger than the gravity load represented by the line L1 in a region before the arm unit 50 reaches the horizontal raised position (i.e., a region or position in which the angle of rotation substantially becomes from 50 degrees to 75 degrees, and which is called "a predetermined load region"). By such a design of the springs 19, in a region where the gravity load by the arm unit 50 becomes relatively large, the arm unit 50 can be supported by the urging force of the springs 19 in an effective manner, and the load applied to the actuator 24 can be reduced. Here, note that in a region where the gravity load by the arm unit 50 becomes further larger than that in the predetermined load region (i.e. a region or position in which the angle of rotation of the arm unit 50 substantially becomes from 75 degrees to 90 degrees), the speed reduction ratio due to the linkage mechanism 30 becomes relatively large, as mentioned above, and hence, even if the urging force of the springs 19 becomes lower in comparison with the load gravity, as shown in FIG. 11, the gravity load applied to the actuator 24 can be mitigated.

Further, as shown in FIG. 11, in a region where the gravity load by the arm unit 50 becomes smaller than that in the predetermined load region (i.e., a region or position in which the angle of rotation of the arm unit 50 substantially becomes from 0 degrees to 50 degrees), the speed reduction ratio due to the linkage mechanism 30 is relatively small, as mentioned above, but the gravity load by the arm unit 50 itself is relatively small, so even if the urging force of the springs 19 becomes lower in comparison with the load gravity, as shown in FIG. 11, the gravity load applied to the actuator 24 is not so large as to prevent the reduction in size of the actuator 24.

Thus, by setting the urging force of the springs 19 in consideration of the correlation thereof with the speed reduction ratio by the linkage mechanism 30, the gravity load applied to the actuator 24 can be reduced in the entire rotational driving range of the arm unit 50, and the reduction in size of the actuator 24 can be attained.

Here, returning to FIG. 10, reference will again be made to the linkage mechanism 30. In cases where the arm unit 50 is in the horizontal raised position, as shown in (b) of FIG. 10, the gravity load by the arm unit 50 can be supported at the first support point 33 in an efficient manner, as mentioned above, by the second support point 34 and the third support point 35 being located substantially in alignment with each other along the z axis on the basis of the first support point 33. At this time, the first link unit 31 is formed in a shape (i.e., a recumbent V or doglegged shape) bent unevenly to the side of the third support point 35, as mentioned above. For that reason, in cases where the connection point 31e of the first link unit 31 is displaced from the state shown in (a) of FIG. 10 to the state shown in (b) of FIG. 10, the first straight line connecting between the first support point 33 and the second support point 34 and the second straight line connecting between the second support point 34 and the third support point 35 are easier to come into alignment with each other due to the bent shape of the first link unit 31. In the linkage mechanism 30, in cases where the arm unit 50 is in the horizontal raised position, it is easy to obtain the effect due to the support of the gravity load by the first support point 33 because the first straight line and the second straight line come to a state of being closer to alignment with each other. Accordingly, the above-mentioned bent shape in the first link unit 31 need only be designed in consideration of the support of the gravity load by this first support point 33.

In addition, it is also preferable to decide the above-mentioned bent shape in the first link unit 31, from the point of view of the ease of carrying out rotational driving of the first link unit 31 from the state in which the first straight line and the second straight line has become aligned with each other. In the case where the first straight line and the second straight line has become aligned with each other, if the straight line connecting between the connection point 31e and the first support point 33 is located on an extension of the first straight line, etc., it becomes difficult to apply a return torque to the first link unit 31, at the time of returning from the state shown in (b) of FIG. 10 to the state shown in (a) of FIG. 10. Accordingly, it is preferable to decide the bent shape in the first link unit 31 in consideration of the ease of carrying out of the rotational driving of the first link unit 31.

Here, note that in this embodiment, a cross roller ring can be used as the support member 28 for the rotational support of the arm unit 50, as mentioned above. The cross roller ring is a support member capable of supporting loads from many directions. For that reason, for the support of loads with respect to the arm unit 50, a cross roller operates in a suitable manner, and accordingly, the rigidity required of the actuator 24, which serves to manage the pitch rotation of the arm unit 50, can be made small, and from this, too, the reduction in size of the actuator 24 can be attained.

<Modification>

In the above-mentioned embodiment, in order to apply an urging force in the raising (upward) rotational direction to the arm unit 50, the springs 19 are arranged between the posterior sternal part 14d and the plate 51, but instead of such an arrangement, the springs 19 may be arranged between the first link unit 31 or the second link unit 32, which together constitute the linkage mechanism 30, and the upper half body skeletal structure of the robot 10. However, as shown in FIG. 10, both the link units may change in their states to a large extent in the rotational driving range of the arm unit 50, and hence, at the time of connecting the springs 19, it is necessary to connect them with the link units at positions at which the springs 19 do not interfere with both the link units.

REFERENCE SIGNS LIST

10 . . . robot,
14 . . . backbone part,
14a . . . anterior clavicular part,
14b . . . posterior clavicular part,
14c . . . anterior sternal part,
14d . . . posterior sternal part,
15 . . . haunch bone part,
17a . . . support point,
19 . . . springs,
20 . . . driving units
21 . . . outer base plate,
22 . . . inner base plate,
24, 25 . . . actuators,
28 . . . support member,
30 . . . linkage mechanism
31 . . . first link unit
31a . . . wall portion,
31b . . . bridge,
31c . . . base portion,
31d . . . tail portion,
31e . . . connection point,
32 . . . second link unit
33 . . . first support point,
34 . . . second support point,
35 . . . third support point,
50 . . . arm unit,
51 . . . plate

The invention claimed is:

1. A support structure for an upper half body of a robot, comprising:
a columnar backbone part extending in an upward direction from a haunch bone part of said robot;

an upper half body support part connected to said backbone part and extending from said backbone part to a side of said robot; and a driving unit on which an arm unit of said robot is rotatably mounted and which is provided at least with a predetermined actuator for driving said arm unit to rotate from the outside of said arm unit;

wherein said driving unit is connected to said upper half body support part and said haunch bone part at a first connection point on said upper half body support part which is away a predetermined distance from a connection point of said upper half body support part and said backbone part to a side thereof, and at a second connection point on said haunch bone part, respectively.

2. The support structure for an upper half body of a robot, as set forth in claim 1 wherein said backbone part is a columnar member having a predetermined thickness;

said upper half body support part is a member formed into a plate shape which is thinner than said predetermined thickness;

said driving unit includes:

a first base member with said arm unit rotatably mounted thereon; and a second base member arranged at a location opposed to said first base member and fixedly secured to said first member to form an accommodation space for receiving at least said predetermined actuator between said first base member and said second base member;

said predetermined actuator is fixedly secured to at least either one of said first base member and said second base member in a state of being received in said accommodation space; and said driving unit is connected with said upper half body support part and said haunch bone part, with said first base member and said second base member of said driving unit extending between said first connection point and said second connection point.

3. The support structure for an upper half body of a robot as set forth in claim 2, wherein said upper half body support part has a front upper half body support part located at the front side of said robot, and a rear upper half body support part located at the rear side of said robot, across said backbone part; and said first base member and said second base member are connected at their front sides with said front upper half body support part, and said first base member and said second base member are connected at their rear sides with said rear upper half body support part, with said driving unit being sandwiched between said front upper half body support part and said rear upper half body support part.

4. The support structure for an upper half body of a robot as set forth in claim 2, wherein the connection of said driving unit with said upper half body support part and said haunch bone part is removable when said arm unit is mounted on said first base member.

5. The support structure for an upper half body of a robot as set forth in claim 1, wherein said driving unit is provided, as said predetermined actuator, with an arm unit pitching actuator for driving said arm unit to rotate in a pitch direction.

6. The support structure for an upper half body of a robot as set forth in claim 5, wherein said driving unit is further provided, as said predetermined actuator, with a haunch bone part driving actuator for driving the upper half body of said robot to rotate with respect to said haunch bone part.

* * * * *